US008683609B2

(12) United States Patent
Bravo et al.

(10) Patent No.: US 8,683,609 B2
(45) Date of Patent: Mar. 25, 2014

(54) MOBILE PHONE AND IP ADDRESS CORRELATION SERVICE

(75) Inventors: Jose F. Bravo, Mamaroneck, NY (US); Jeffery L. Crume, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 12/630,875

(22) Filed: Dec. 4, 2009

(65) Prior Publication Data
US 2011/0138483 A1 Jun. 9, 2011

(51) Int. Cl.
G06F 21/00 (2013.01)
(52) U.S. Cl.
USPC ............................................ 726/29; 380/258
(58) Field of Classification Search
USPC ....................................................... 726/29
See application file for complete search history.

(56) References Cited

U.S. PATENT DOCUMENTS

| 4,310,720 | A | 1/1982 | Check, Jr. |
| 5,046,082 | A | 9/1991 | Zicker et al. |
| 5,068,894 | A | 11/1991 | Hoppe |
| 5,323,465 | A | 6/1994 | Avarne |
| 5,457,737 | A | 10/1995 | Wen |
| 5,491,752 | A | 2/1996 | Kaufman et al. |
| 5,497,411 | A | 3/1996 | Pellerin |
| 5,647,388 | A | 7/1997 | Butler, Jr. et al. |
| 5,657,388 | A | 8/1997 | Weiss |
| 5,684,950 | A | 11/1997 | Dare et al. |
| 5,701,339 | A | 12/1997 | Suda |
| 5,749,052 | A | 5/1998 | Hidem et al. |
| 5,841,871 | A | 11/1998 | Pinkas |
| 5,842,124 | A | 11/1998 | Kenagy et al. |
| 5,892,902 | A | 4/1999 | Clark |
| 5,953,422 | A | 9/1999 | Angelo et al. |
| 5,971,272 | A | 10/1999 | Hsiao |
| 6,000,031 | A | 12/1999 | Bingaman et al. |
| 6,169,890 | B1 | 1/2001 | Vatanen |
| 6,278,863 | B1 | 8/2001 | Mabrouki |
| 6,308,268 | B1 | 10/2001 | Audebert |

(Continued)

FOREIGN PATENT DOCUMENTS

DE 10317176 A1 11/2004
EP 1119147 A1 7/2001

(Continued)

OTHER PUBLICATIONS

Lakhia, U.S. Appl. No. 11/753,673, Office Action 1, IBMC-0208, 13 pages, Apr. 15, 2010.

(Continued)

Primary Examiner — Gilberto Barron, Jr.
Assistant Examiner — Devin Almeida
(74) Attorney, Agent, or Firm — Douglas A. Lashmit; Hoffman Warnick LLC

(57) ABSTRACT

A system, method and program product for controlling access to a restricted item. A method is provided that includes: receiving a request for access to a restricted item at a computer system associated with a provider, said request originating from a client system; determining an IP address of the client system; determining a mobile phone number of a mobile phone associated with the requester; transmitting to a third party service provider the IP address and mobile phone number; and receiving back from the third party service provider a confirmation message indicating whether or not the IP address and mobile phone are located within an acceptable range of each other.

19 Claims, 2 Drawing Sheets

(56) References Cited

U.S. PATENT DOCUMENTS

| | | | |
|---|---|---|---|
| 6,324,271 B1 | 11/2001 | Sawyer et al. | |
| 6,330,608 B1 | 12/2001 | Stiles | |
| 6,334,056 B1 | 12/2001 | Holmes et al. | |
| 6,338,140 B1 | 1/2002 | Owens et al. | |
| 6,349,134 B1 | 2/2002 | Katz | |
| 6,385,729 B1 | 5/2002 | DiGiorgio et al. | |
| 6,387,729 B2 | 5/2002 | Eng et al. | |
| 6,393,468 B1 | 5/2002 | McGee | |
| 6,400,726 B1 | 6/2002 | Piret et al. | |
| 6,466,780 B1 | 10/2002 | Geiselman et al. | |
| 6,535,726 B1 | 3/2003 | Johnson | |
| 6,584,309 B1 | 6/2003 | Whigham | |
| 6,687,241 B1 | 2/2004 | Goss | |
| 6,707,915 B1 | 3/2004 | Jobst et al. | |
| 6,731,731 B1 | 5/2004 | Ueshima | |
| 6,993,658 B1 | 1/2006 | Engberg et al. | |
| 6,993,663 B1 | 1/2006 | Paya et al. | |
| 7,007,301 B2 | 2/2006 | Crosbie et al. | |
| 7,024,688 B1 | 4/2006 | Faccin et al. | |
| 7,025,179 B2 | 4/2006 | Shih | |
| 7,028,179 B2 | 4/2006 | Anderson et al. | |
| 7,058,796 B2 | 6/2006 | Lynn et al. | |
| 7,058,968 B2 | 6/2006 | Rowland et al. | |
| 7,100,204 B1 | 8/2006 | Myllymaki et al. | |
| 7,133,662 B2 * | 11/2006 | Bravo et al. | 455/411 |
| 7,142,840 B1 | 11/2006 | Geddes et al. | |
| 7,221,949 B2 | 5/2007 | Clough | |
| 7,290,278 B2 | 10/2007 | Cahill et al. | |
| 7,317,693 B1 | 1/2008 | Roesch et al. | |
| 7,324,976 B2 * | 1/2008 | Gupta et al. | 705/65 |
| 7,337,431 B1 | 2/2008 | Barnes et al. | |
| 7,357,310 B2 | 4/2008 | Calabrese et al. | |
| 7,360,248 B1 | 4/2008 | Kanevsky et al. | |
| 7,376,431 B2 | 5/2008 | Niedermeyer | |
| 7,379,921 B1 | 5/2008 | Kiliccote | |
| 7,380,708 B1 | 6/2008 | Kiliccote | |
| 7,447,494 B2 | 11/2008 | Law et al. | |
| 7,480,805 B1 | 1/2009 | Gnech et al. | |
| 7,491,308 B2 | 2/2009 | Talieh et al. | |
| 7,519,989 B2 | 4/2009 | Lin et al. | |
| 7,533,414 B1 | 5/2009 | Reed et al. | |
| 7,536,634 B2 | 5/2009 | Green et al. | |
| 7,540,022 B2 | 5/2009 | Barari et al. | |
| 7,594,270 B2 | 9/2009 | Church et al. | |
| 7,600,676 B1 | 10/2009 | Rados et al. | |
| 7,609,625 B2 | 10/2009 | Wei et al. | |
| 7,623,458 B2 | 11/2009 | Ayyagari et al. | |
| 7,624,447 B1 | 11/2009 | Horowitz et al. | |
| 7,665,128 B2 | 2/2010 | Yang | |
| 7,673,334 B2 | 3/2010 | Takemori et al. | |
| 7,715,823 B2 | 5/2010 | Bravo et al. | |
| 7,716,742 B1 | 5/2010 | Roesch et al. | |
| 7,757,285 B2 | 7/2010 | Kubota | |
| 7,765,584 B2 | 7/2010 | Roskind | |
| 7,779,465 B2 | 8/2010 | Baker et al. | |
| 7,823,199 B1 | 10/2010 | Rathi et al. | |
| 7,840,993 B2 | 11/2010 | Ganesan et al. | |
| 7,845,004 B2 | 11/2010 | Bardsley et al. | |
| 7,886,346 B2 | 2/2011 | Sandhu et al. | |
| 7,926,108 B2 | 4/2011 | Rand et al. | |
| 7,930,540 B2 | 4/2011 | Ahuja et al. | |
| 7,954,150 B2 | 5/2011 | Croft et al. | |
| 7,975,293 B2 | 7/2011 | Yoshida et al. | |
| 8,019,995 B2 | 9/2011 | van Bemmel | |
| 8,024,567 B2 | 9/2011 | Han | |
| 8,050,658 B2 | 11/2011 | Hong | |
| 8,060,915 B2 | 11/2011 | Voice et al. | |
| 8,136,150 B2 | 3/2012 | Hayler et al. | |
| 8,150,370 B2 | 4/2012 | Dempo et al. | |
| 8,151,327 B2 | 4/2012 | Eisen | |
| 8,181,248 B2 | 5/2012 | Oh et al. | |
| 8,201,217 B1 | 6/2012 | Begen et al. | |
| 8,254,542 B2 | 8/2012 | Frederick | |
| 8,281,375 B2 | 10/2012 | von Krogh | |
| 8,285,639 B2 * | 10/2012 | Eden et al. | 705/39 |
| 8,296,823 B2 | 10/2012 | Schubert | |
| 8,301,877 B2 | 10/2012 | Grajek et al. | |
| 8,302,180 B1 | 10/2012 | Gudov et al. | |
| 8,302,187 B1 | 10/2012 | Gupta et al. | |
| 2001/0054155 A1 | 12/2001 | Hagan et al. | |
| 2002/0069165 A1 | 6/2002 | O'Neil | |
| 2002/0091931 A1 | 7/2002 | Quick et al. | |
| 2002/0095588 A1 | 7/2002 | Shigematsu et al. | |
| 2002/0178070 A1 | 11/2002 | Leveridge | |
| 2002/0178370 A1 | 11/2002 | Gurevich et al. | |
| 2003/0014315 A1 | 1/2003 | Jaalinoja et al. | |
| 2003/0154382 A1 | 8/2003 | Vicard | |
| 2003/0172272 A1 | 9/2003 | Ehlers et al. | |
| 2004/0148520 A1 | 7/2004 | Talpade et al. | |
| 2004/0152446 A1 | 8/2004 | Saunders et al. | |
| 2004/0198329 A1 | 10/2004 | Vasa | |
| 2005/0015624 A1 | 1/2005 | Ginter et al. | |
| 2005/0018618 A1 | 1/2005 | Mualem et al. | |
| 2005/0022020 A1 | 1/2005 | Fremberg | |
| 2005/0060535 A1 | 3/2005 | Bartas | |
| 2005/0075070 A1 | 4/2005 | Crilly, Jr. | |
| 2005/0182958 A1 | 8/2005 | Pham et al. | |
| 2005/0187934 A1 | 8/2005 | Motsinger et al. | |
| 2005/0188423 A1 | 8/2005 | Motsinger et al. | |
| 2005/0210251 A1 | 9/2005 | Nyberg et al. | |
| 2006/0021031 A1 | 1/2006 | Leahy et al. | |
| 2006/0036690 A1 | 2/2006 | O'Neil | |
| 2006/0094403 A1 | 5/2006 | Norefors et al. | |
| 2006/0095955 A1 | 5/2006 | Vong et al. | |
| 2006/0288411 A1 | 12/2006 | Garg et al. | |
| 2007/0015492 A1 | 1/2007 | Bravo et al. | |
| 2007/0067828 A1 | 3/2007 | Bychkov | |
| 2007/0083606 A1 | 4/2007 | Malik et al. | |
| 2007/0084913 A1 * | 4/2007 | Weston | 235/380 |
| 2007/0107050 A1 | 5/2007 | Selvarajan | |
| 2007/0136573 A1 | 6/2007 | Steinberg | |
| 2007/0136808 A1 | 6/2007 | Xiong | |
| 2007/0143851 A1 | 6/2007 | Nocodemus et al. | |
| 2007/0186099 A1 | 8/2007 | Beck et al. | |
| 2007/0234426 A1 | 10/2007 | Khanolkar et al. | |
| 2007/0261112 A1 | 11/2007 | Todd et al. | |
| 2007/0266257 A1 | 11/2007 | Camaisa et al. | |
| 2008/0028447 A1 | 1/2008 | O'Malley et al. | |
| 2008/0172730 A1 | 7/2008 | Sandhu et al. | |
| 2008/0181380 A1 | 7/2008 | Gustave et al. | |
| 2008/0189776 A1 | 8/2008 | Constable | |
| 2008/0209275 A1 | 8/2008 | Kwan et al. | |
| 2008/0270301 A1 | 10/2008 | Jones et al. | |
| 2008/0281737 A1 | 11/2008 | Fajardo | |
| 2008/0318548 A1 | 12/2008 | Bravo et al. | |
| 2009/0037329 A1 | 2/2009 | Coppinger et al. | |
| 2009/0077637 A1 | 3/2009 | Santos et al. | |
| 2009/0094682 A1 | 4/2009 | Sage et al. | |
| 2009/0095588 A1 | 4/2009 | Thomas | |
| 2009/0104889 A1 * | 4/2009 | Lotvonen et al. | 455/410 |
| 2009/0106138 A1 | 4/2009 | Smith et al. | |
| 2009/0300738 A1 | 12/2009 | Dewe et al. | |
| 2010/0024017 A1 | 1/2010 | Ashfield et al. | |
| 2010/0051686 A1 | 3/2010 | Obi | |
| 2010/0095351 A1 | 4/2010 | Liu et al. | |
| 2010/0269162 A1 | 10/2010 | Bravo et al. | |
| 2011/0015449 A1 | 1/2011 | Pendleton et al. | |
| 2011/0039237 A1 | 2/2011 | Skare | |
| 2011/0138483 A1 | 6/2011 | Bravo et al. | |
| 2011/0197070 A1 | 8/2011 | Mizrah | |
| 2011/0225647 A1 | 9/2011 | Dilley et al. | |
| 2011/0277024 A1 | 11/2011 | Begley et al. | |
| 2011/0289576 A1 | 11/2011 | Cheng | |
| 2012/0011066 A1 | 1/2012 | Telle et al. | |
| 2012/0149334 A1 | 6/2012 | Zhang et al. | |
| 2012/0204241 A1 | 8/2012 | Varsavsky et al. | |
| 2012/0264405 A1 | 10/2012 | Bravo et al. | |
| 2012/0272331 A1 | 10/2012 | Lemaster et al. | |
| 2013/0007859 A1 | 1/2013 | Bravo et al. | |

FOREIGN PATENT DOCUMENTS

| | | |
|---|---|---|
| GB | 2456509 A | 7/2009 |
| JP | 10334048 | 12/1998 |

(56) References Cited

FOREIGN PATENT DOCUMENTS

| | | |
|---|---|---|
| JP | 10341224 | 12/1998 |
| JP | 2001111545 | 4/2001 |
| WO | 0109808 A1 | 8/2001 |
| WO | 2004079499 A2 | 9/2004 |
| WO | 2006103387 A1 | 10/2006 |
| WO | 2008147353 A1 | 12/2008 |

OTHER PUBLICATIONS

Lakhia, U.S. Appl. No. 11/753,673, Final Office Action 1, IBMC-0208, 13 pages, Oct. 8, 2010.

Lakhia, U.S. Appl. No. 11/753,673, Office Action 2, IBMC-0208, 15 pages, Dec. 22, 2011.

Lakhia, U.S. Appl. No. 11/753,673, Notice of Allowance 1, IBMC-0208, 11 pages, Jun. 18, 2012.

Lakhia, U.S. Appl. No. 11/753,673, Notice of Allowance 2, IBMC-0208, 14 pages, Jan. 8, 2013.

Megeed, U.S. Appl. No. 12/423,928, Office Action 1, IBMC-0326, 21 pages, Aug. 25, 2011.

Megeed, U.S. Appl. No. 12/423,928, Final Office Action 1, IBMC-0326, 20 pages, Nov. 10, 2011.

Megeed, U.S. Appl. No. 12/423,928, Office Action 2, IBMC-0326, 20 pages, Jun. 8, 2012.

Megeed, U.S. Appl. No. 12/423,928, Notice of Allowance 1, IBMC-0326, 10 pages, Sep. 25, 2012.

Megeed, U.S. Appl. No. 12/423,928, Notice of Allowance 2, IBMC-0326, 19 pages, Dec. 4, 2012.

Bibbee, U.S. Appl. No. 11/765,193, Office Action 1, 15 pages, Feb. 18, 2010.

Bibbee, U.S. Appl. No. 11/765,193, Office Action 2, 14 pages, Nov. 29, 2010.

Bibbee, U.S. Appl. No. 11/765,193, Office Action 3, 18 pages, Sep. 19, 2011.

Bibbee, U.S. Appl. No. 11/765,193, Final Office Action 1, 15 pages, Jul. 30, 2010.

Bibbee, U.S. Appl. No. 11/765,193, Final Office Action 2, 17 pages, May 12, 2011.

Bibbee, U.S. Appl. No. 11/765,193, Final Office Action 3, 18 pages, Apr. 16, 2012.

Tran, U.S. Appl. No. 11/524,340, Office Action, 9 pages, Jul. 29, 2009.

Tran, U.S. Appl. No. 11/524,340, Office Action, 19 pages, Oct. 31, 2008.

Tran, U.S. Appl. No. 11/524,340, Notice of Allowance, 11 pages, Dec. 29, 2009.

Tran, U.S. Appl. No. 11/524,340, Office Action, 7 pages, Apr. 29, 2009.

Tran, U.S. Appl. No. 11/524,340, Office Action, 22 pages, May 27, 2008.

Juels, "Strengthening EPC Tags Against Cloning", WISE '05, Sep. 2, 2005, pp. 67-75.

Kumaraguru et al., "Getting Users to Pay Attention to Anti-Phishing Education: Evaluation of Retention and Transfer", APWG eCrime Researchers Summit, Oct. 4-5, 2007, Pittsburgh, PA pp. 70-81.

Adida, "BeamAuth: Two-Factor Web Authentication with a Bookmark", CCS '07, Oct. 29-Nov. 2, 2007, Alexandria, VA, ACM 978-1-59593-703-2/07/0010, pp. 48-57.

Nassar et al., "Holistic VoIP Intrusion Detection and Prevention System", IPTCOMM '07, ACM 2007, pp. 1-9.

Stoll et al., "Sesame: Informing User Security Decisions with System Visualization", CHI 2008 Proceedings, Am I Safe, Apr. 5-10, 2008, Florence, Italy, pp. 1045-1054.

Lee et al., "A Resilient Packet-Forwarding Scheme against Maliciously Packet-Dropping Nodes in Sensor Networks" SASN '06, Oct. 30, 2005, ACM 1-59593-544-J/06/0010, pp. 59-69.

Deng et al., "Defending Against Redirect Attacks in Mobile IP", CCS '02, Nov. 18-22, 2002, ACM 1-58113-612-9/02/0011, pp. 59-67.

Kaafar et al., "Real attacks on virtual networks: Vivaldi out of tune", SIGCOMM '06 Workshops, Sep. 11-15, 2006, ACM 1-59593-417-0/06/0009, pp. 139-146.

Geneiatakis et al., "Survey of Security Vulnerabilities in Session Initiation Protocol", 3rd Quarter 2006, vol. 8, No. 3, IEEE Communications Surveys & Tutorials, pp. 68-81.

"Prevent Online Banking Fraud", Dec. 7, 2010, http://www.phonefactor.com/products/transaction-verification, 1 pages.

Bonzo, U.S. Appl. No. 11/776,619, Office Action, Sep. 30, 2009, 12 pages.

Bonzo, U.S. Appl. No. 11/776,619, Notice of Allowance, Apr. 29, 2010, 10 pages.

Alicherry et al., "DoubleCheck: Multi-ath Verification Against Man-in-the-Middle Attack", IEEE 2009, pp. 557-563.

Koo et al., "VoIP Interception in P2P SIP Environment", 2010 IEEEE, vol. 1, pp. 331-334.

Kopsidas et al., "Voice Interactive Personalized Security (VoIPSEC) protocol: Fortify Internet telephony by providing end-to-end security through inbound key exchange and biometric verification", 2006 IEEE, 10 pgs.

Leung, "Depress Phishing by CAPTCHA with OTP", Department of Information Engineering the Chinese University of Hong Kong, IEEE 2009, 6 pgs.

Viral, U.S. Appl. No. 11/753,673, Notice of Allowance, Aug. 21, 2012, 7 pages.

Lakhia, U.S. Appl. No. 13/432,956, Office Action 1, IBMC-0208-CON, Feb. 14, 2013, 26 pages.

Gee, U.S. Appl. No. 13/084,823, Office Action, IBMC-0395, Mar. 11, 2013, 8 pages.

Ma et al., "Beyond Blacklists: Learning to Detect Malicious Web Sites from Suspicious URLs", KDD '09, Jul. 28-Jul. 1, 2009, pp. 1245-1253.

Lakhia, U.S. Appl. No. 13/432,956, Notice of Allowance & Fees Due, Apr. 15, 2013, 27 pages.

Bibbee, U.S. Appl. No. 11/765,193, Examiner's Answer, Apr. 16, 2013, 20 pages.

Vaughan, U.S. Appl. No. 12/423,928, Notice of Allowance & Fees Due, Jul. 11, 2013, 25 pages.

Lakhia, U.S. Appl. No. 11/753,673, Notice of Allowance & Fees Due, dated May 10, 2013, 28 pages.

\* cited by examiner

MOBILE PHONE AND IP ADDRESS CORRELATION SERVICE

FIELD OF THE INVENTION

This disclosure is related generally to detecting man-in-the-middle attacks, and more particularly to an authentication infrastructure having a third party location correlation service that ensures privacy protections.

BACKGROUND OF THE INVENTION

In certain instances it is useful to know if a physical location of a mobile device associated with a user correlates to the location of a second device being used by the user. By comparing the geographical locations of the two devices, the user can be authenticated. If the two locations are not physically near each other, it may be assumed that a man-in-the-middle attack is underway as the transaction appears to emanate from a location that is distant from the actual user.

One of the issues of utilizing location correlation is that it allows for tracking and collection of precise location details of individuals which, from a privacy perspective, may be undesirable.

SUMMARY OF THE INVENTION

The present invention provides an authentication infrastructure in which a third party location correlation service provider is implemented separately from a restricted item provider (i.e., provider) to ensure privacy for users.

In one embodiment, there is a method for controlling access to a restricted item, comprising: receiving a request from a requester for access to a restricted item at a computer system associated with a provider, said request originating from a client system; determining an IP address of the client system; determining a mobile phone number of a mobile phone associated with the requester; transmitting to a third party service provider the IP address and mobile phone number; and receiving back from the third party service provider a confirmation message indicating whether or not the IP address and mobile phone are located within an acceptable range of each other.

In a second embodiment, there is a system for controlling access to a restricted item, comprising: a login system for receiving a request from a requester to a restricted item, said request originating from a client system; a system for determining an IP address of the client system; a system for determining a mobile phone number of a mobile phone associated with the requester; a system for transmitting to a third party service provider the IP address and mobile phone number; and a system for inputting from the third party service provider a confirmation message indicating whether or not the IP address and mobile phone are located within an acceptable range of each other.

In a third embodiment, there is a computer readable storage medium having a program product for controlling access to a restricted item, comprising: program code for receiving a request from a requester to a restricted item, said request originating from a client system; program code for determining an IP address of the client system; program code for determining a mobile phone number of a mobile phone associated with the requester; program code for transmitting to a third party service provider the IP address and mobile phone number; and program code for inputting from the third party service provider a confirmation message indicating whether or not the IP address and mobile phone are located within an acceptable range of each other.

In a fourth embodiment, there is a method for deploying a system for controlling access to a restricted item, comprising: providing a computer infrastructure being operable to: receive a request from a requester for access to a restricted item at a computer system associated with a provider, said request originating from a client system; determine an IP address of the client system; determine a mobile phone number of a mobile phone associated with the requester; transmit to a third party service provider the IP address and mobile phone number; and receive back from the third party service provider a confirmation message indicating whether or not the IP address and mobile phone are located within an acceptable range of each other.

A location correlation service as described herein could be offered by mobile phone providers to merchants, banks and other organizations for any authentication purposes, e.g., processing credit cards for e-commerce, e-banking transactions, content access, etc. Companies could use the service to authenticate business partners accessing their organization's infrastructure via a VPN or extranet web site. The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
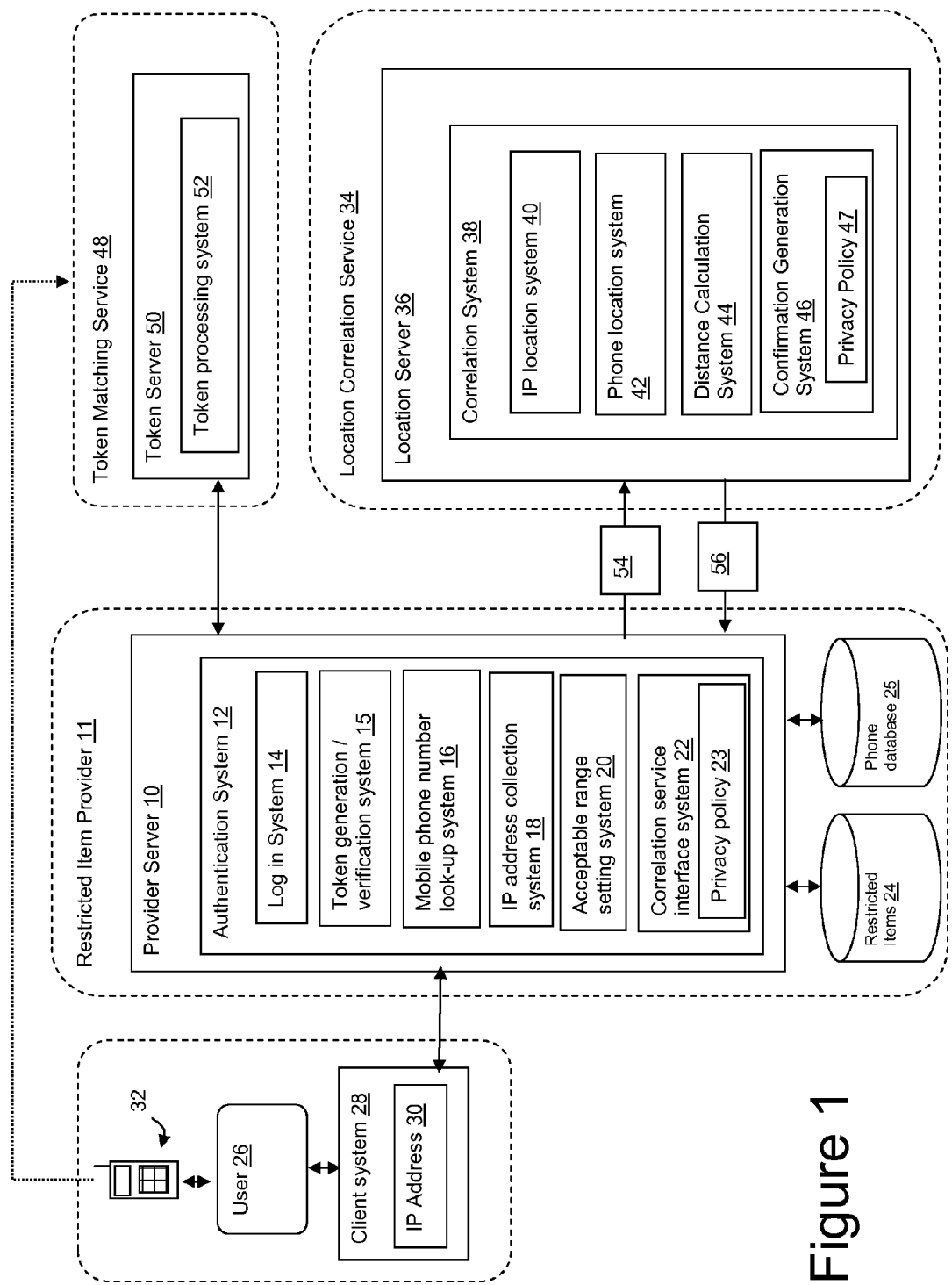
FIG. 1 depicts an illustrative authentication infrastructure in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The described embodiments provide solutions for maintaining privacy when location information is required to authenticate a user attempting to access a restricted item over a network from a restricted item provider, i.e., "provider." The provider may be any entity that controls access to restricted items, e.g., a bank, a business, a web site, a server, etc. In some authentication embodiments, such as that described in US 2008/0318548 US1, published on Dec. 25, 2008, entitled "Method and System for Strong Authentication and Defense against Man-In-the-Middle Attacks," the contents of which are hereby incorporated by reference, the location of the user's mobile phone and the location of the user's computer IP address are examined by the restricted item provider to determine if the two are proximately located.

The present approach provides a third party location correlation service that can be tuned to limit the exposure of precise location details of the user while still providing the necessary information to authenticate the user to the restricted item provider. Namely, the third party location correlation service may be utilized to provide only a yes/no confirmation as to whether a mobile phone is within a specified range of a given IP address. Thus, the restricted item provider can thwart man-in-the-middle attacks without ever having to know any location information of the user.

Referring now to FIG. 1, an illustrative embodiment of an authentication infrastructure is shown that generally includes a restrictive item provider 11, a token matching service 48 and a location correlation service 34. Restricted item provider 11 generally comprises any entity that provides access to restricted item 24 via a network such as the World Wide Web (Web) to a user 26 via a client system 28. Client system 28 may comprise any device, software or system, such as a computer and browser, handheld device, ATM machine, transaction processor, etc., that utilizes a unique network identifier, such as an IP (Internet Protocol) address or the like to interface with the restricted item provider 11 via a provider server 10.

Within this infrastructure, authentication of user 26 by restricted item provider 11 is implemented as follows. Provider server 10 includes an authentication system 12, which may for example be implemented as any combination of hardware and software (i.e., a computer system and/or a program product). Authentication system 12 generally includes: a log in system 14; a token generation/verification system 15; a mobile phone number look-up system 16; an IP address collection system 18; an acceptable range setting system 20; and a correlation service interface system 22. When user 26 seeks to access a restricted item 24 from restricted item provider 11, user 26 points their client system 28 to the provider server 12 (e.g., by entering a Web address into a browser). Restricted item 24 may comprise any item, e.g., data, object, program, communication channel, etc., for which authorization is required. Common examples of restricted items 24 include account data, transaction systems, subscription-based content, etc.

When attempting to access the provider server 10, user 26 is first presented with a log in system 14, where the user is verified, e.g., by entering a user ID and password. Once the user's ID and password are verified, token generation/verification system 15 generates a one-time token that is forwarded back to the user 26 via the client system 28. The user 26 is then prompted to enter the one time token into the user's mobile phone 32, which is forwarded to token matching service 48 via a cellular network or the like. In a parallel process, a mobile phone number look-up system 16 retrieves a previously stored (i.e., pre-registered) mobile phone number of the user 26 from a phone database 25. The mobile phone number of the user 26 and the generated one time token are also forwarded to the token matching service 48 from the provider server 10.

A token server 50 provides a token processing system 52 that compares the phone number (e.g., using caller ID) and token obtained from the user 26 via the mobile phone 32 with the phone number and token information separately obtained from the authentication system 12. If the data matches, this then verifies that the mobile phone 32 being used to submit the token belongs to the user 26. If the data does not match, this then indicates that a man-in-the-middle attack or other type of unauthorized access may be occurring since an unauthorized mobile phone was utilized to submit the token. Note that some or all of the processing being done by token matching service 48 could be done by a third party provider or by the restricted item provider 11 itself, e.g., at the provider server 10. In addition, it is understood that any type of token may be utilized, e.g., an alphanumeric code that user 26 types into their phone, a password that the user speaks, etc. A detailed description of token processing is disclosed in U.S. Pat. No. 7,133,662 issued on Nov. 7, 2006 to Bravo et al., entitled "Method and apparatus for restricting access of a user using a cellular telephone," the contents of which is hereby incorporated by reference.

Assuming the token is verified, a further authentication process is utilized to ensure that the mobile phone 32 is located proximate to the client system 28. To implement this, IP address collection system 18 collects the IP address 30 of the client system 28, e.g., during the log in procedure. An acceptable distance between the mobile phone 32 and the client system 28 may be set by acceptable range setting system 20. Given that current technology does not always allow for pinpointing an exact location of a mobile phone 32 or IP address 30 of client system 28, authentication system 12 provides this mechanism for setting an acceptable range value (e.g., 10 miles). By allowing the restricted item provider 11 to set this value, provider 11 can dictate their own level of risk tolerance.

Once the user's mobile phone number and IP address 30 are determined, they are packaged and sent to location correlation server 34 with the acceptable range value in a transmission 54 by correlation service interface system 22. As noted herein, an aspect of this disclosure involves ensuring privacy for the user 26. More particularly, the user's location based on their mobile phone 32 should not be tracked and/or stored by the restricted item provider 11 or other third parties. Correlation service interface system 22 ensures this feature by utilizing a privacy policy 23 requiring a third party service to simply confirm whether or not the acceptable distance between the mobile phone 32 and the client system 28 is met. The privacy policy 23 does not allow for the collection of actual mobile phone location data by the restricted item provider 11 from the location correlation service 34.

Accordingly, location correlation service 34 must be implemented as a separate disparate entity relative to restricted item provider 11. In one embodiment, location correlation service 34 may be implemented by a cellular provider as a service for organizations, such as banks and other businesses. Location correlation service 34 generally includes a location server 36 that has a correlation system 38 for confirming whether a mobile phone is located proximate an IP address. Correlation system 38 includes an IP location system 40 for determining a geographic location of an IP address. Such systems are readily known (e.g., www.geobytes.com/IPlocator.htm). Phone location system 42 utilizes any known means for locating a mobile phone based on the phone number. Examples include cell tower triangulation, GPS, etc. Once correlation system 38 ascertains the geographic location of both the IP address 30 and mobile phone 32, distance calculation system 44 determines a distance between the two, e.g., based on longitude and latitude. Confirmation generation system 46 then determines if the calculated distance is less than the acceptable range value provided by the restricted item provider 11. A confirmation message 56 (e.g., yes or no) is then returned to correlation service interface system 22 of the restricted item provider 11. If the proximity of the mobile phone 32 and the IP address 30 is confirmed as with the acceptable range, authentication system 12 can then allow access to the restricted item 24 for the user 26. Otherwise, the user 26 is denied access.

Confirmation generation system 46 may likewise include a privacy policy 47 that ensures that only a simple confirmation message 56 will be returned to the requesting party. Privacy policy 47 may also enforce other privacy measures, such that the information handled by the correlation system 38 will be disposed of in an acceptable manner. The privacy policies 23 and 47 may be exchanged using, e.g., P3P protocol, prior to, or as part of, the transaction to ensure that the required level of privacy will be met.

Figure 2:
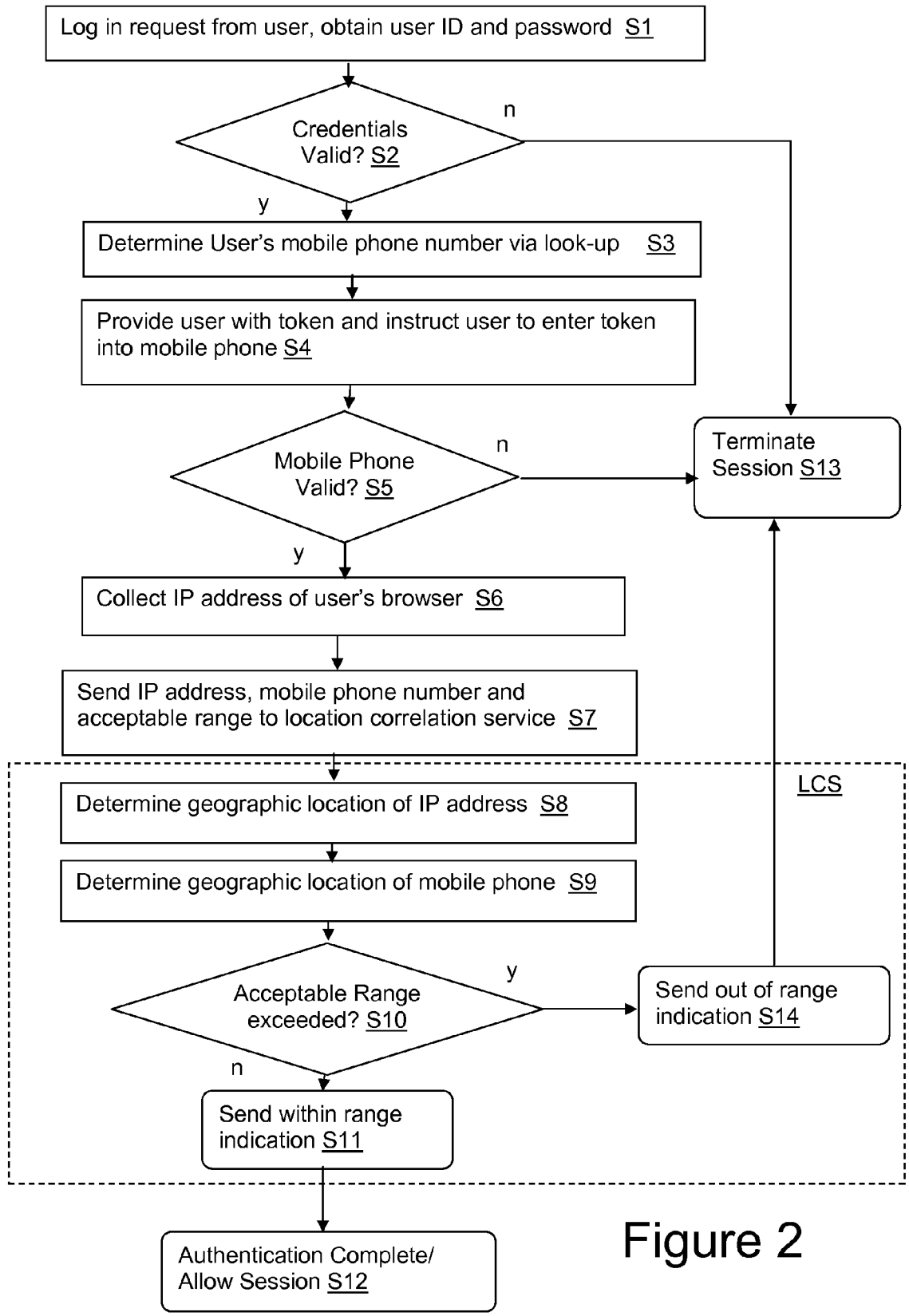
FIG. 2 depicts a flow chart showing a method in accordance with an embodiment of the present invention.

FIG. 2 depicts a flow chart showing an illustrative method of a user being authenticated by a provider. At S1, a log in request is obtained from a user at a provider's server, e.g., by pointing a browser at the log in page, where a user ID and password are collected from the user. At S2, a check is made to determine if the credentials (i.e., user ID and password) are valid. If no, the session is terminated at S13. If yes, then the mobile number of the user is determined by the provider via a look-up, e.g., from a provider's database, at S3. At S4, the user is provided a one time token from the provider, which the user then enters into his or her mobile phone, e.g., using the keypad. At S5, a service (e.g., a cellular provider) receives the token and the user's phone number via caller ID, and compares it with the phone number and token provided to the user by the provider. If they do not match, a man-in-the middle attack is suspected since an invalid phone is being used to enter the token and the session is terminated at S13. If they do match, the mobile phone is deemed valid (i.e., it belongs to or is authorized for the user) and the IP address of the user's browser is collected at S6. Note that the IP address of the browser can be collected earlier, e.g., during log in.

Next, at S7, the IP address, the mobile phone number and the acceptable range is sent to a location correlation service (LCS). The acceptable range is determined in this case by the provider based on a risk tolerance of the provider. However, it could be set by the LCS. As noted, because of the need for privacy, the LCS is a separate entity from the provider. The LCS determines the geographic location of the IP address and mobile phone at S8 and S9. A physical distance between the two is calculated by the LCS using any technique and a determination is then made whether the two are located within the acceptable range at S10. The acceptable range, as well as the determined distance between the two, may be provided/calculated in miles, kilometers, longitudinal/latitudinal coordinates, etc.

If the two are not within the acceptable range, an "out of range" indication is sent back to the provider at S14 and the session is terminated at S13. If the acceptable range is not exceeded, then a "within range" indication is sent to the provider at S11 and the user is fully authenticated and the session is allowed at S12.

Note that while the embodiments are described with reference to a mobile phone, the invention may be implemented with any device that has a unique discoverable identifier (e.g., phone number, email address, IP address, etc.) and can transmit a token to a token service provider.

Referring again to FIG. 1, it is understood that each of the authentication system 12, token server 50 and location server 36 may be implemented using any type of computing device (i.e., computer system). Such a computing device generally includes a processor, input/output (I/O), memory, and bus. The processor may comprise a single processing unit, or be distributed across one or more processing units in one or more locations, e.g., on a client and server. Memory may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a correlation system 38 and/or token processing system 52 could be created, maintained and/or deployed by a service provider that offers the functions described herein for customers. That is, a service provider could offer to deploy or provide the ability to provide authentication as described above.

It is understood that in addition to being implemented as a system and method, the features may be provided as one or more program products stored on computer-readable storage mediums, which when run, enables one or more computer systems to provide authentication as described. To this extent, the computer-readable storage medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for controlling access to a restricted item, the method comprising:
    receiving a request from a requester for access to a restricted item at a computer system associated with a provider, said request originating at a client system;
    determining an IP address of the client system using the computer system associated with the provider;
    receiving a telephonic communication from a mobile phone associated with the requester using the computer system associated with the provider,
    wherein the requester initiates the telephonic communication using the mobile phone;
    determining a geographical location of the mobile phone based on the requester-initiated telephonic communication using the mobile phone;
    determining a mobile phone number of the mobile phone associated with the requester using the computer system associated with the provider;
    transmitting to a third party service provider, distinct from the computer system associated with the provider, the IP address, the mobile phone number, the geographical location of the mobile phone and an acceptable range,
    wherein the acceptable range includes a predetermined distance between the mobile phone and the client system; and
    receiving back from the third party service provider a confirmation message indicating whether the IP address and the mobile phone are located within the acceptable range of each other, wherein the third party service provider determines whether the IP address and the mobile phone are located within the acceptable range of each other based on the transmitted IP address, the geographical location of the mobile phone and the mobile phone number.

2. The method of claim 1, further comprising:
    providing a token via the client system to the requester;
    prompting the requester to transmit said token via the mobile phone associated with the requester;
    verifying that the token was transmitted by the mobile phone associated with the requester.

3. The method of claim 1, further comprising verifying a user ID and password of the requester.

4. The method of claim 1, further comprising:
    ensuring that a privacy policy is in place to guarantee that no location data of the mobile phone associated with the requester will be provided to the provider.

5. The method of claim 1, wherein the mobile phone number of the mobile phone associated with the requester is pre-registered with the provider.

6. The method of claim 1, further comprising authenticating the requester to allow access to the restricted item in response to a confirmation message that verifies that the mobile phone and IP address are located within the acceptable range of each other.

7. A computer system comprising:
    at least one computing device configured to control access to a restricted item, by performing actions including:
        receiving a request from a requester to a restricted item, said request originating from a client system;
        determining an IP address of the client system;
        receiving a telephonic communication from a mobile phone associated with the requester using the computer system associated with the provider,
        wherein the requester initiates the telephonic communication using the mobile phone;
        determining a geographical location of the mobile phone based on the requester-initiated telephonic communication using the mobile phone;
        determining a mobile phone number of the mobile phone associated with the requester;
        transmitting to a third party service provider, distinct from the at least one computing device, the IP address, the mobile phone number, the geographical location of the mobile phone and an acceptable range,
        wherein the acceptable range includes a predetermined distance between the mobile phone and the client system; and
        receiving, from the third party service provider, a confirmation message indicating whether the IP address and the mobile phone are located within the acceptable range of each other, wherein the third party service provider determines whether the IP address and the mobile phone are located within the acceptable range of each other based on the transmitted IP address, the geographical location of the mobile phone and the mobile phone number.

8. The computer system of claim 7, further comprising:
    providing a token to the requester via the client system;
    prompting the requester to transmit said token via the mobile phone associated with the requester; and
    verifying that the token was transmitted by the mobile phone associated with the requester.

9. The computer system of claim 7, further comprising verifying a user ID and password of the requester.

10. The computer system of claim 7, further comprising:
    a privacy policy that guarantees that no location data of the mobile phone associated with the requester will be provided to the provider.

11. The computer system of claim 7, wherein the mobile phone number of the mobile phone associated with the requester is pre-registered with the provider.

12. The computer system of claim 7, further comprising authenticating the requester to allow access to the restricted item in response to a confirmation message that verifies that the mobile phone and IP address are located within the acceptable range of each other.

13. A non-transitory computer readable medium having a program product for controlling access to a restricted item, which when executed by at least one computing device, causes the at least one computing device to perform actions including:

receiving a request from a requester to a restricted item, said request originating from a client system;

determining an IP address of the client system;

receiving a telephonic communication from a mobile phone associated with the requester using the computer system associated with the provider, wherein the requester initiates the telephonic communication using the mobile phone;

determining a geographical location of the mobile phone based on the requester-initiated telephonic communication using the mobile phone;

determining a mobile phone number of the mobile phone associated with the requester;

transmitting to a third party service provider the IP address, the mobile phone number, the geographical location of the mobile phone and an acceptable range, wherein the acceptable range includes a predetermined distance between the mobile phone and the client system; and receiving from the third party service provider a confirmation message indicating whether the IP address and the mobile phone are located within the acceptable range of each other, wherein the third party service provider determines whether the IP address and the mobile phone are located within the acceptable range of each other based on the transmitted IP address, the geographical location of the mobile phone and the mobile phone number.

14. The non-transitory computer readable medium of claim 13, further causing the at least one computing device to perform actions including:

providing a token to the requester via the client system;

prompting the requester to transmit said token via the mobile phone associated with the requester; and verifying that the token was transmitted by the mobile phone associated with the requester.

15. The non-transitory computer readable medium of claim 13, further causing the at least one computing device to perform actions including:

verifying a user ID and password of the requester.

16. The non-transitory computer readable medium of claim 13, further causing the at least one computing device to perform actions including:

a privacy policy that guarantees that no location data of the mobile phone associated with the requester will be provided to the provider.

17. The non-transitory computer readable medium of claim 13, wherein the mobile phone number of the mobile phone associated with the requester is pre-registered with the provider.

18. The non-transitory computer readable medium of claim 13, further causing the at least one computing device to perform actions including:

authenticating the requester to allow access to the restricted item in response to a confirmation message that verifies that the mobile phone and IP address are located within the acceptable range of each other.

19. A method for deploying a system for controlling access to a restricted item, comprising:

providing a computer infrastructure being operable to:

receive a request from a requester for access to a restricted item at a computer system associated with a provider, said request originating from a client system;

determine an IP address of the client system;

receive a telephonic communication from a mobile phone associated with the requester using the computer system associated with the provider, wherein the requester initiates the telephonic communication using the mobile phone;

determine a geographical location of the mobile phone based on the requester- initiated telephonic communication using the mobile phone;

determine a mobile phone number of the mobile phone associated with the requester;

transmit to a third party service provider, distinct from the computer infrastructure, the IP address, the mobile phone number, the geographical location of the mobile phone, and an acceptable range, wherein the acceptable range includes a predetermined distance between the mobile phone and the client system; and receive back from the third party service provider a confirmation message indicating whether the IP address and the mobile phone are located within the acceptable range of each other, wherein the third party service provider determines whether the IP address and the mobile phone are located within the acceptable range of each other based on the transmitted IP address, the geographical location of the mobile phone and the mobile phone number.

\* \* \* \* \*